US005486666A

United States Patent [19]
Wong et al.

[11] Patent Number: 5,486,666
[45] Date of Patent: Jan. 23, 1996

[54] PROTECTIVE COVER FOR ELECTRICAL TERMINALS AND METHOD OF USING SAME

[75] Inventors: Tak M. Wong, Cedar Rapids; Ronald J. Etsheidt, Anamosa; Patrick L. Freilinger, Cedar Rapids, all of Iowa

[73] Assignee: Square D Company, Palatine, Ill.

[21] Appl. No.: 935,756

[22] Filed: Nov. 24, 1992

[51] Int. Cl.$^6$ ............................................. H01H 9/02
[52] U.S. Cl. ................................ 200/304; 200/305/333
[58] Field of Search ................................... 200/304, 305, 200/333, 400, 401, 293, 306; 220/337, 333, 334, 336, 338

[56] References Cited

U.S. PATENT DOCUMENTS

| 3,054,880 | 9/1962 | Harman, Jr. ............................ | 200/293 |
| 3,970,808 | 7/1976 | Gryctko et al. ........................ | 200/293 |
| 5,150,091 | 9/1992 | Hart et al. .............................. | 200/304 |

Primary Examiner—Henry J. Recla
Assistant Examiner—David J. Walczak
Attorney, Agent, or Firm—Larry I. Golden; Kareem M. Irfan

[57] ABSTRACT

The present invention provides a cover for an exposed electrical terminal mounted on an electrical distribution device. The cover includes a generally planar body member having sufficient size to substantially cover the exposed terminal. The cover demountably secures to the device so that contact with a person's finger or equipment is prevented while access to the remainder of the device is allowed. The body is manually attached and detached from the device. The cover is also integrally formed with the body.

The present invention also includes a method of safely protecting an exposed terminal mounted on an electrical distribution device. The method includes the step of demountably securing a cover to the device so that contact with a person's finger or equipment is prevented while access to the remainder of the device is allowed. The cover is manually attached and detached from the device.

16 Claims, 2 Drawing Sheets

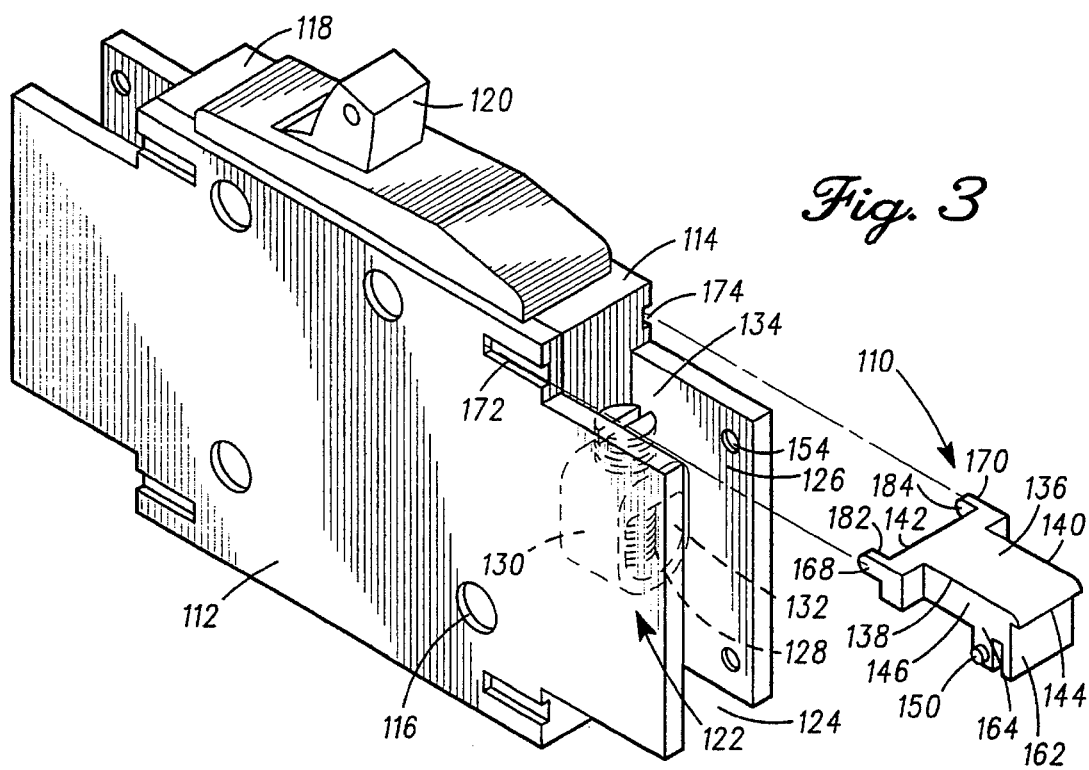

PROTECTIVE COVER FOR ELECTRICAL TERMINALS AND METHOD OF USING SAME

FIELD OF THE INVENTION

The present invention relates to circuit breakers, electrical distribution devices, and the like, which have an exposed electrical terminal and, more particularly, to a cover which protects the exposed terminal and is manually and demountably secured to the device.

BACKGROUND OF THE INVENTION

Electric circuit breakers are commonly used to protect branch circuits in residential and commercial buildings against overload and fault conditions. Basically, a circuit breaker comprises a pair of separable contacts, a spring-operated mechanism for effecting separation of the contacts, and a tripping mechanism which automatically releases the operating mechanism upon the occurrence of an overload or fault condition.

Circuit breakers and other electrical distribution devices are often constructed with terminals to form an electrical disconnect. Even though the terminals are mounted slightly below the surface of the circuit breaker's casing, it is possible that an operator could be severely burned or shocked if they accidentally touched the terminals while installing the circuit breaker. Further, adjacent circuit breakers could be short circuited if they were accidentally joined by a conducting material across the respective terminals. The terminals may also be subject to damage during the installation of other components near the circuit breaker.

In view of increasing safety requirements for circuit breaker compartments already in operation that do not contain a protective apparatus for exposed electrical terminals, there is a need for a field-installed protective cover that fits the circuit breaker casing designs of various manufacture.

SUMMARY OF THE INVENTION

Accordingly, an object of the present invention is to provide a protective cover which can be used with circuit breakers and other electrical distribution devices which are already operating in the field.

Another object of the invention is to provide a cover which can be manually assembled with a circuit breaker and, thereafter, manually removed without the need for tools or equipment.

A further object of the invention is to provide a protective cover which can be entirely or partially removed for access to the terminal.

Still another object of the invention is to provide a circuit breaker or like structure which has no exposed terminal or disconnect members.

In accordance with the present invention, a cover is provided for an exposed electrical terminal mounted on an electrical distribution device. The cover includes a generally planar body member having sufficient size to substantially cover the exposed terminal. The cover includes means for demountably securing the body to the device so that contact with a person's finger or equipment is prevented while access to the remainder of the device is allowed. The securing means is manually attached and detached from the device. The securing means is also integrally formed with the body.

Preferably, the body is defined by two sides and two ends. One embodiment of the body includes a pair of rounded side flanges integrally formed with and extending perpendicularly downward from the sides of the body. Each side flange extends partially along the length of the side. A nib is centrally located on and extends outwardly from each side flange. Each nib is aligned to form a pivotal axis extending perpendicularly through the center of each nib. Each nib is adapted to mate with a corresponding dimple located on the device. An end flange is integrally formed with and extends perpendicularly downward from the other end of the body which is opposite the side flanges. The end flange extends in a parallel direction beyond the sides of the body to define two distal edges. Each distal edge includes a tab projecting in a perpendicular direction from the distal edge towards the nibs. Each tab is adapted to abut with a corresponding indentation in the device.

Another embodiment of the body includes a pair of side flanges which are integrally formed with and extend perpendicularly downward from the sides of the body. Each side flange extends substantially along the length of the side. A nib is located on and extends outwardly from each side flange. Each nib is positioned towards one end of the body and adapted to mate with a corresponding dimple located on the device. A pair of tabs extend from the other end of the body which is opposite the nibs and project in a perpendicular direction outwardly from the other end. Each tab is adapted to be inserted into a corresponding slot on the device.

The present invention also includes an electrical distribution device for controlling electrical service. The device includes a casing and a terminal mounted on the casing. At least a portion of the terminal is exposed for connection to electrical service. The device includes a cover having a body of sufficient size to cover the exposed terminal and means for demountably securing the body to the device so that contact with a person's finger or equipment is prevented while access to the remainder of the device is allowed. The securing means is manually attached and detached from the device. The securing means is also integrally formed with the body.

The present invention also contemplates a method of safely protecting an exposed terminal mounted on an electrical distribution device. The method includes the step of demountably securing a cover to the device so that contact with a person's finger or equipment is prevented while access to the remainder of the device is allowed. The cover is manually attached and detached from the device.

Preferably, the method includes the step of molding a cover having spaced apart securing members adapted to engage within the side walls of the device. The preferred method also includes the step of releasing one end of the cover and pivoting the cover on a pivotal axis at one of the body so that the opposite end of the cover pivots away from the exposed terminal to provide access to the terminal without detaching the entire cover from the device.

Other and further advantages, embodiments, variations and the like will be apparent to those skilled in the art from the present specification taken with the accompanying drawings and appended claims.

BRIEF DESCRIPTION OF THE DRAWINGS

In the drawings, which comprise a portion of this disclosure;

FIG. 3 is a perspective view of another embodiment of a protective apparatus of this invention which is shown in disassembled combination with an electric terminal mounted on a circuit breaker;

FIG. 3A is an enlarged fragmentary perspective view of the embodiment of FIG. 3 which is shown in its assembled form; and FIG. 4 is an enlarged perspective view of the embodiment of FIG. 1.

DETAILED DESCRIPTION

Figure 1:
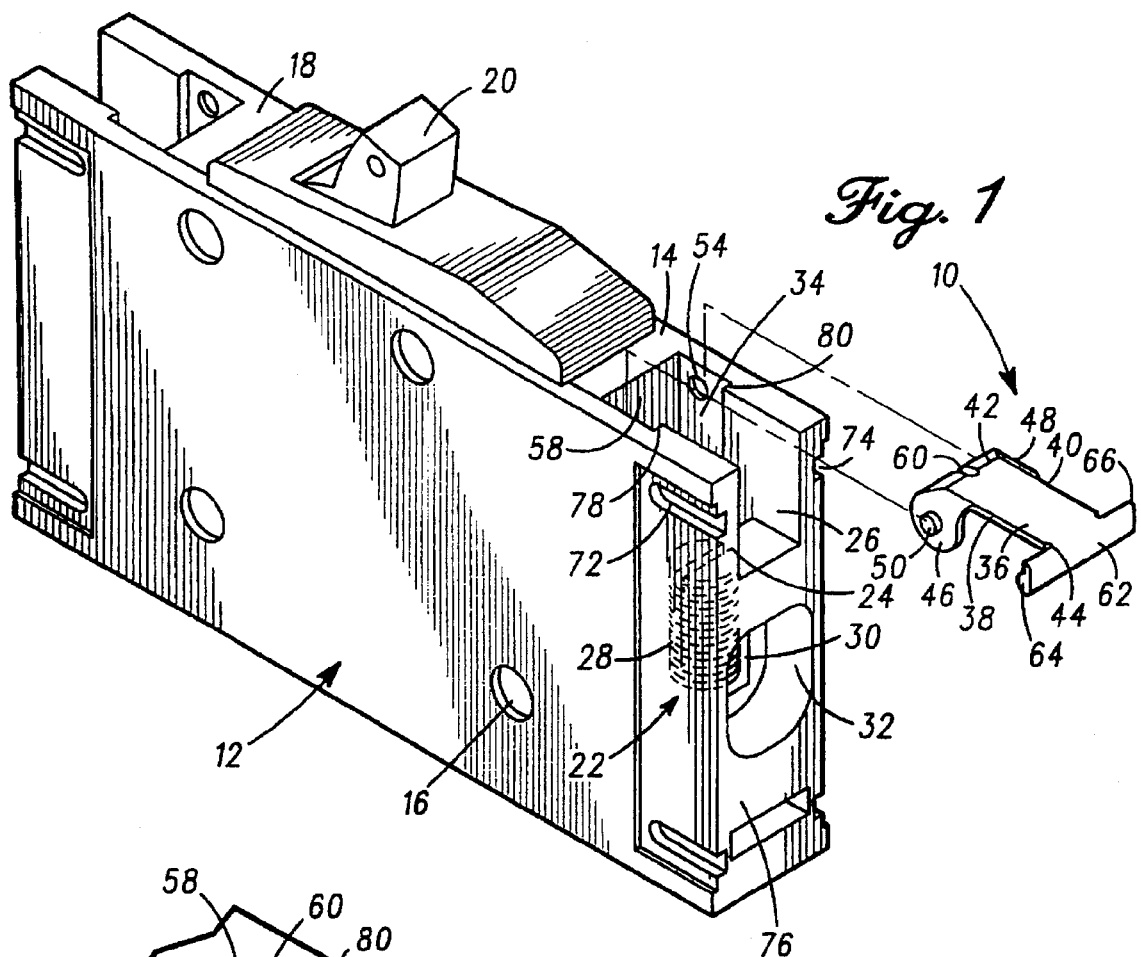
FIG. 1 is a perspective view of one embodiment of a protective apparatus of this invention which is shown in disassembled combination with an electric terminal mounted on a circuit breaker.
Figure 1A:
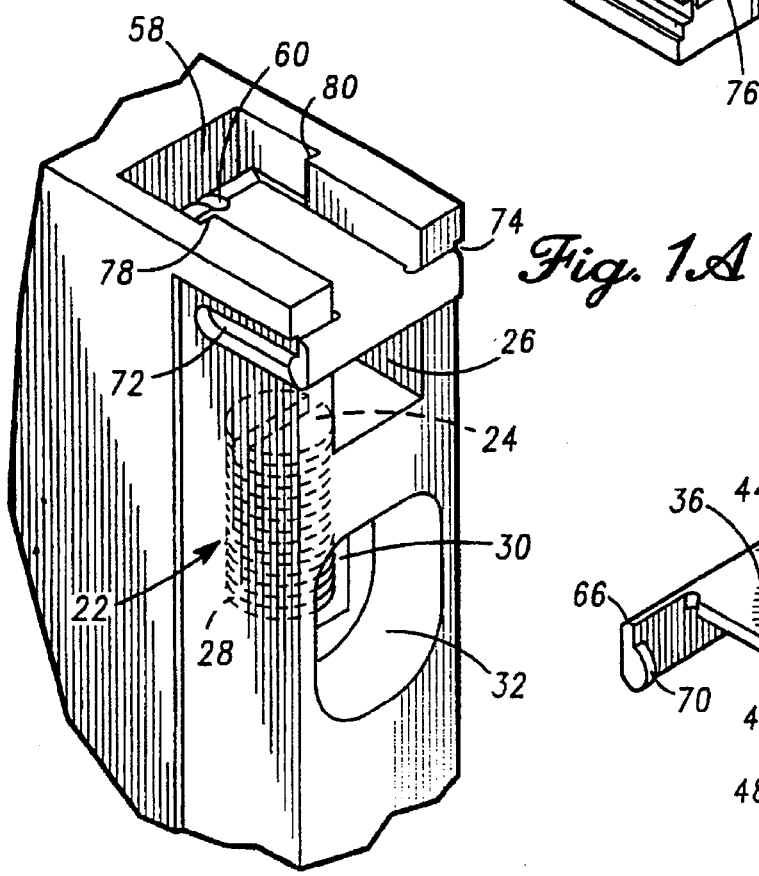
FIG. 1A is an enlarged fragmentary perspective view of the embodiment of FIG. 1 which is shown in assembled combination with an electric terminal mounted on a circuit breaker.
Figure 2:
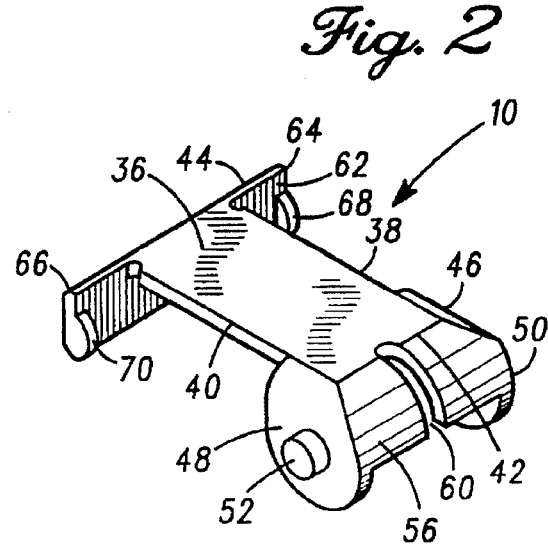
FIG. 2 is an enlarged perspective view of the embodiment of a protective apparatus of FIG. 1.

Referring to the drawings, FIGS. 1 and 1A illustrate an embodiment 10 of a cover of the present invention which is respectively shown detached and attached to a single-pole circuit breaker 12. FIG. 2 is an isolated view of the embodiment 10.

The circuit breaker 12 is a conventional type which is suitable for mounting on a panelboard. A representative circuit breaker is fully set forth in U.S. Pat. No. 2,889,428, issued to Kingdon et al. and commonly assigned hereto, which is incorporated herein by reference. The components of the circuit breaker 12 are housed within a casing 14 assembled from multiple pieces with rivets 16. The circuit breaker 12 has a front face 18 which must be accessible for installation and, subsequently, for operation of a switch handle 20.

A terminal assembly 22 is mounted on the casing 14 between the interior faces of side walls 24 and 26 to provide the circuit breaker 12 with electrical connection to external load service or branch circuits. The terminal 22 includes a machine screw 28 carried by a lug body 30 having suitable threaded surfaces to engage the screw 28. The lug body 30 is provided with an aperture 32 which, together with the other portions of the terminal assembly 22, provide for the connection of wire or cable conductors to the circuit breaker 12 by pinching the wire between the screw 28 and the bottom of the lug body 30. The top area 34 of the terminal assembly is open and exposed from the front face 18 of the circuit breaker to provide access to the screw 28 for installation or subsequent maintenance.

The embodiment 10 provides a generally flat, planar body 36 which is of sufficient size to substantially cover the portion of the terminal 22 exposed through the top area 34 of the front face 18 of the circuit breaker. The body 36 is defined by two sides 38 and 40 as well as two ends 42 and 44.

The body end 42 is demountably secured to the circuit breaker 12 by spaced apart members like rounded side flanges 46 and 48 integrally formed with body sides 38 and 40 respectively. Each side flange 46, 48 extends downwardly and in a perpendicular direction from the body sides 38, 40, respectively. The side flanges 46, 48 extend partially along the length of the body sides 38, 40 from the body end 42. Nibs 50 and 52 are centrally located on and project outwardly from the side flanges 46 and 48, respectively. Each nib 50, 52 is adapted to mate with a corresponding dimple or depression, like 54, on the interior of side walls 26 of the casing.

Preferably, the nibs 50, 52 define a pivotal axis extending in a perpendicular direction through the centers thereof. The pivotal axis allows the opposite end 44 of the body to pivot away from the top area 34 of the terminal to provide access to the screw 28 without detaching the entire embodiment 10 from the circuit breaker 12.

An arcuate flange 56 is integrally formed with body end 42 and the side flanges 46, 48 to provide reinforcement and allow the embodiment 10 to pivot about the pivotal axis without striking the recessed side face 58 of the casing. A slot 60 is centrally located in the arcuate flange 56 to permit inward compression of the side flanges 46, 48 for attaching or detaching the embodiment 10 to the circuit breaker 12.

Located at the other end 44 of the body opposite the end 42 with the side flanges 46, 48 is another member of the securing means. An end flange 62 is integrally formed with and extends perpendicularly downward from body end 44. The end flange 62 extends in a parallel direction beyond the sides 38, 40 of the body to define two distal edges 64 and 66, respectively. Positioned on each distal edge 64, 66 is a tab 68, 70 projecting in a perpendicular direction from the distal edge 64, 66 towards the nibs 50, 52. Each tab 68, 70 is adapted to abut with a corresponding indentation 72 and 74, respectively, formed in a side face 76 of the casing.

Preferably, embodiment 10 is attached to the circuit breaker 12 by compressing the side flanges 46, 48 between one's fingers and inserting the nibs 50, 52 against the interior side walls 24, 26 of the casing. The embodiment 10 is pushed further until the nibs 50, 52 engage the dimples 54. Subsequently, the other end 44 of the body is pushed downwardly until the tabs 68, 70 engage the indentations 72, 74 in the side face 76 of the casing. The side flanges 46, 48 are offset from the sides 38, 40 of the body to define a pre-determined distance between each side flange 46, 48 and each tab 68, 70. As the body 36 is rotated downward, each side flange 46, 48 abuts a corresponding offset 78, 80 in the casing 14. The predetermined distance is slightly smaller than the distance between the offsets 78, 80 and the side face 76 of the casing. The result is a resilient engaging force for each tab 68, 70 to abut with the corresponding indentations 72, 74.

The present invention is not limited to the mating members described herein and contemplates other means for demountably securing the body 36 to the casing 14. In order to fit covers to circuit breakers and other electrical distribution devices already in the field, however, the configuration of the device must be taken into account.

Referring to the drawings, FIGS. 3 and 3A illustrate another embodiment 110 of a cover of the present invention which is respectively shown detached and attached to a single-pole circuit breaker 112. FIG. 4 is an isolated view of the embodiment 110.

As previously discussed, the components of the circuit breaker 112 are housed within a casing 114 assembled from multiple pieces with rivets 116. The circuit breaker 112 has a front face 118 which must be accessible for installation and, subsequently, for operation of a switch handle 120.

A terminal assembly 122 is mounted on the casing 114 between the interior faces of side walls 124 and 126 to provide the circuit breaker 112 with electrical connection to external load service or branch circuits. The terminal 122 includes a machine screw 128 carried by a lug body 130 having suitable threaded surfaces to engage the screw 128. The lug body 130 is provided with an aperture 132 which, together with the other portions of the terminal assembly 122, provide for the connection of wire or cable conductors to the circuit breaker 112 by pinching the wire between the screw 128 and the bottom of the lug body 130. The top area 134 of the terminal assembly is open and exposed from the front face 118 of the circuit breaker to provide access to the screw 128 for installation or subsequent maintenance.

The embodiment 110 provides a generally flat, planar body 136 which is of sufficient size to substantially cover the portion of the terminal 122 exposed through the top area 134 of the front face 118 of the circuit breaker. The body 136 is defined by two sides 138 and 140 as well as two ends 142 and 144.

The body end 142 is demountably secured to the circuit breaker 112 by spaced apart members like side flanges 146 and 148 integrally formed with body sides 138 and 140, respectively. Each side flange 146, 148 extends downwardly and in a perpendicular direction from the body sides 138, 140, respectively. The side flanges 146, 148 extend substantially along the length of the body sides 138, 140 between the body ends 142 and 144. Nibs 150 and 152 are located on the side flanges 146 and 148, respectively, and positioned towards the body end 144. Each nib 150, 152 is adapted to mate with a corresponding dimple or depression, like 154, on the interior of side wall 126 of the casing.

An end flange 162 is integrally formed with the body end 144 and the side flanges 146, 148 to provide reinforcement and protection from inadvertent access to the terminal 122. Preferably, each side flange 146, 148 includes a tooth-like member 164, 166 upon which the nibs 150, 152 are centrally located. The tooth-like members 164, 166 permit inward compression of the side flanges 146, 148 for attaching or detaching the embodiment 110 to the circuit breaker 112.

Located at the other end 142 of the body is a pair of tabs 168 and 170 which project outwardly from the end 142. Each tab 168, 170 is adapted to be inserted into a corresponding slot 172, 174 on the casing 114. The body 136 is laterally held in position by straddling the casing 114 between the interior faces 182, 184 of the tabs 168, 170.

Preferably, embodiment 110 is attached to the circuit breaker 112 by inserting tabs 168, 170 into indentations 172, 174 on the casing 114. Subsequently the body end 144 is secured by compressing the tooth-like members 164, 166 on the side flanges 146, 148 between one's fingers and inserting the nibs 150, 152 against the interior side walls 124, 126 of the casing. The embodiment 110 is pushed downwardly until the nibs 150, 152 engage the dimples 154.

As discussed above, the present invention also provides a method of safely protecting the exposed terminal 22 mounted on the circuit breaker 12. By demountably securing a cover to the circuit breaker 12, contact with a person's finger, tools or other equipment is prevented. Yet, access is provided to the remainder of the circuit breaker 12 such as the operating handle 20.

One of the many unique features of the present invention is the use of the pre-existing configuration of the circuit breaker's casing to attach the cover. The casings were not originally designed to accommodate a cover. For example, the dimples or depressions, like 54 and 154 described above, exist on many circuit breaker casings from the molding process used to form the pieces of the casing.

The present invention is not only novel in its utilization of the casing's configuration, but the cover is also reusable. The cover is easily detached for subsequent access to the terminal and can be re-attached to the casing. Furthermore, the mounting is accomplished by simple manual manipulation, entirely without tools.

Certain embodiments of the present invention, like 10, provide the additional advantage of rotating a closed cover on a pivotal axis to gain access to the terminal 22. Since the cover is not entirely removed, it is not accidentally misplaced prior to re-attachment. Also, a person's hands are left free to handle tools for working on the terminal 22.

Preferably, the cover of the present invention is made of a resilient, electrically-insulating thermoplastic. Conventional plastic forming processes such as injection molding are contemplated for use in making covers of the present invention. Other materials are also suitable. Even metal can be used with an electrically insulating coating.

The inventive cover can be made in various colors, although, safety-related colors like red and yellow are preferred. Warning labels, symbols, or instructions can be readily attached to the top of the cover. Such items can also be integrally formed along the top of the cover.

The present invention is specifically disclosed for use with one, two and three pole circuit breakers manufactured by the Square D Company under the catalog designation QOU and QYU, Class 600 circuit breakers. These circuit breakers are utilized in QO (registered trademark of the Square D Company) load centers which were originally introduced to the marketplace over 35 years ago and have been continually updated.

As those skilled in the art will appreciate, the inventive cover can be adapted and configured for usage with a wide variety of circuit breakers and other electrical distribution devices. Adapting the shape of the cover to utilize features of a circuit breaker casing to demountably secure the cover thereto allows upgrading the safety of devices already in the marketplace.

It will be further understood that whereas a circuit breaker is illustrated, the term electrical distribution device is defined to include circuit breakers and other types of control units or circuit interrupters, including but not limited to, panelboards, switches, fuses, and combinations thereof.

While particular embodiments and applications of the present invention has been illustrated and described, it is to be understood that the invention is not limited to the precise construction and compositions disclosed herein and that various modifications, changes, and variations which will be apparent to those skilled in the art may be made in the arrangement, operation, and details of construction of the invention disclosed herein without departing from the spirit and scope of the invention as defined in the appended claims.

What is claimed is:

1. A cover for an exposed electrical terminal mounted on an electrical distribution device, the cover including:

a generally planar body having upper and lower surfaces and of sufficient size to substantially cover the exposed terminal, the body being defined by two side edges and two end edges and including a pair of rounded side flanges disposed at a first end of said body and being integrally formed with and extending perpendicularly downward from the side edges of the body, each side flange extending partially along a length of the side edge, a nib being centrally located on each side flange, each nib extending outwardly from the side flange, each nib being aligned to form a pivotal axis extending perpendicularly through the center of each nib, each nib being adapted to mate with a corresponding dimple located on the device, an end flange being integrally formed with and extending perpendicularly downward from the other end of the body which is opposite the side flanges, the end flange having opposite ends which extend beyond respective side edges of the body to define two distal edges, each distal edge having a tab projecting from the distal edge towards the nibs, each tab being adapted to abut with a corresponding indentation in the device;

wherein said nibs, when attached to said corresponding dimples, enable the body to be secured to the device so that a person's finger or equipment is prevented from contacting the exposed terminal while access to the remainder of the device is allowed, the nibs allowing the body to be manually attached and detached from the device, and allowing the body to pivot away from the exposed terminal to provide access to the terminal without detaching the entire cover from the device.

2. The cover of claim 1 wherein each side flange is offset from the side edge of the body to define a predetermined spacing between each side flange and each tab on the end flange so that, when the cover is attached to the device, the offset of each side flange abuts the device and provides a resilient engaging force for each tab to abut with the corresponding indentation.

3. The cover of claim 1 wherein the body further includes an arcuate flange being integrally formed with the end of the body and the side flanges, the arcuate flange having a centrally located slot permitting inward compression of the side flanges, and the configuration of the arcuate flange being sufficient to allow the cover to pivot about the pivotal axis without the arcuate flange striking the device.

4. A cover for an exposed electrical terminal mounted on an electrical distribution device, the cover including:

a generally planar body having upper and lower surfaces and of sufficient size to substantially cover the exposed terminal, the body being defined by two side edges and two end edges and including a pair of side flanges disposed at a first end of said body and being integrally formed with and extending perpendicularly downward from the side edges of the body, each side flange extending substantially along a length of the side edge between the two end edges, a nib being located on and extending outwardly from each side flange, each nib positioned towards one end of the body and adapted to mate with a corresponding dimple located on the device, a pair of tabs extending from the other end of the body which is opposite the side flanges and projecting beyond respective side edges of the body, each tab adapted to be inserted into a corresponding slot on the device;

wherein said nibs, when attached to said corresponding dimples, enable the body to be secured to the device so that a person's finger or equipment is prevented from contacting the exposed terminal while access to the remainder of the device is allowed, the nibs allowing the body to be manually attached and detached from the device.

5. The cover of claim 4 wherein the body further includes an end flange being integrally formed with the end of the body and the side flanges, each side flange having a tooth-like member upon which the nib is centrally located, each tooth-like member permitting inward compression of the side flanges.

6. The cover of claim 4 wherein the cover is made of an electrically-insulating, resilient material.

7. The cover of claim 4 wherein the cover is made of a thermoplastic material.

8. An electrical distribution device for controlling electrical service, said device including:

a casing;

a terminal mounted on said casing, at least a portion of the terminal being exposed for connection to electrical service;

a cover having a body of sufficient size to cover the exposed terminal, the body defined by two side edges and two end edges and the body including a pair of rounded side flanges disposed at a first end of said body and being integrally formed with and extending perpendicularly downward from the side edges of the body, each side flange extending partially along a length of the side edge, a nib being centrally located on and extending outwardly from each side flange, each nib being aligned to form a pivotal axis extending perpendicularly through a center of each nib, each nib being adapted to mate with a corresponding dimple located on the device, an end flange being integrally formed with and extending perpendicularly downward from the other end of the body which is opposite the side flanges, the end flange having opposite ends which extend beyond respective side edges of the body to define two distal edges, each distal edge having a tab projecting from the distal edge towards the nibs, each tab being adapted to abut with a corresponding indentation in the device;

wherein said nibs, when attached to said corresponding dimples, enable the body to be secured to the device so that a person's finger or equipment is prevented from contacting the exposed terminal while access to the remainder of the device is allowed, the nibs allowing the body to be manually attached and detached from the device and allowing the body to pivot away from the exposed terminal to provide access to the terminal without detaching the entire cover from the device.

9. The device of claim 8 wherein each side flange is offset from the side edge of the body to define a predetermined spacing between each side flange and each tab on the end flange so that, when the cover is attached to the device, the offset of each side flange abuts the device and provides a resilient engaging force for each tab to abut with the corresponding indentation.

10. The device of claim 8 wherein the body further includes an arcuate flange being integrally formed with the end of the body and the side flanges, the arcuate flange having a centrally located slot permitting inward compression of the side flanges, and the configuration of the arcuate flange being sufficient to allow the cover to pivot about the pivotal axis without the arcuate flange striking the device.

11. An electrical distribution device for controlling electrical service, said device including:

a casing;

a terminal mounted on said casing, at least a portion of the terminal being exposed for connection to electrical service;

a cover having a body of sufficient size to cover the exposed terminal, the body defined by two side edges and two end edges and the body including a pair of side flanges being integrally formed with and extending perpendicularly downward from the side edges of the body, each side flange extending substantially along a respective side edge between the two end edges, a nib being located on and extending outwardly from each side flange, each nib positioned toward one end of the body and adapted to mate with a corresponding dimple located on the device, a pair of tabs extending from the other end of the body which is opposite the side flanges and projecting beyond respective side edges of the body, each tab adapted to be inserted into a corresponding slot on the device;

wherein said nibs, when attached to said corresponding dimples, enable the body to be secured to the device so that a person's finger or equipment is prevented from contacting the exposed terminal while access to the remainder of the device is allowed, the nibs allowing the body to be manually attached and detached from the device.

12. The device of claim 11 wherein the projecting tabs include interior faces which abut each side of the device to laterally position the body.

13. The device of claim 11 wherein the body further includes an end flange being integrally formed with the end of the body and the side flanges, each side flange having a tooth-like member upon which the nib is centrally located, each tooth-like member permitting inward compression of each side flange.

14. The device of claim 11 wherein the cover is made of an electrically-insulating, resilient material.

15. The device of claim 11 wherein the cover is made of a thermoplastic material.

16. The device of claim 11 wherein the device is a circuit breaker.

* * * * *